UNITED STATES PATENT OFFICE 2,576,825

PROCESS FOR MANUFACTURING CARBOXY ACYL DERIVATIVES OF SULFANILAMIDES

Geza Szabados Delmar, Montreal, Quebec, and Ernest Neil Macallum, Como, Quebec, Canada, assignors to Sharp & Dohme (Canada) Ltd., Toronto, Ontario, Canada, a corporation of Canada No Drawing. Application November 29, 1949, Serial No. 130,074. In Canada December 4, 1948

6 Claims. (Cl. 260—239.95)

The present invention relates to a process for the preparation of dicarboxylic acid derivatives of sulfonamides.

PRIOR ART

Acylated sulfonamides have been known since Gelmo first synthesized sulfanilamide in 1908. In his synthesis one of the intermediates was para-acetyl amino benzol sulfonamide.

After the attractive therapeutic properties of sulfanilamide had been discovered efforts continued to develop derivatives with better or more special therapeutical properties. By substituting the $N^1$-group there followed sulfapyridine, sulfathiazole, sulfadiazine, sulfamerazine, sulfaguanidine, only to mention the few of those derivatives which, out of thousands, have achieved wide applications.

Efforts to vary or substitute the $N^4$-group were also numerous. A great number of organic acids have been for instance attached to the $N^4$-group. As a new $N^1$-substituted sulfanilamide appeared, derivatives substituted at the $N^4$-group followed right away. This way there appeared, described in the literature, the various acylated sulfapyridines, sulfathiazoles, etc.

Of the $N^4$-acylated sulfanilamides a particular interest was shown for those derivatives which carried on the $N^4$-group a dicarboxylic acid as a substituent. In these derivatives, one of the carboxyl groups was free to form water soluble sodium or potassium salts. Since most sulfanilamides are poorly soluble in water and their sodium salts yield strongly alkaline solutions it was hoped that the dicarboxylic acid derivatives would result in neutral aqueous solutions when neutralized with alkali carbonates or hydroxides and that such products would still have the attractive therapeutical properties of the unsubstituted sulfanilamide.

While this hope was not fulfilled it was found that at least some of the dicarboxylic acid substituted sulfanilamides possess valuable therapeutic properties in some special therapeutic applications. Among these products phthalylsulfathiazole and succinylsulfathiazole achieved a particular popularity.

Phthalyl- and succinyl- derivatives of sulfanilamide have been prepared since 1939 (J. A. C. S. vol. 61 (1939), p. 1198). Such derivatives can be prepared by heating together the dicarboxylic acid with the sulfanilamide. A better method is to react in the same way the dicarboxylic acid anhydride with the sulfanilamide. This reaction may be carried out also in the presence of a solvent. If a solvent is used other derivatives of the dicarboxylic acid like for instance their chlorides, esters, may be used.

It seems that of all the above processes the use of the dicarboxylic acid anhydride gives the best yield and the smoothest processes (I).

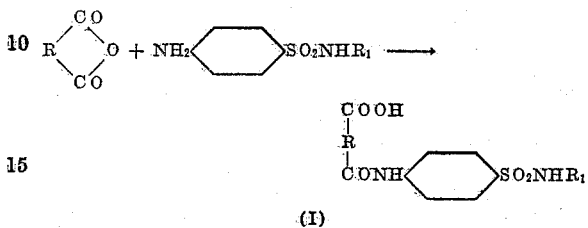

(I)

It has been shown, however, that the conditions under which the dicarboxylic acid anhydride is reacted with the sulfonamide has a big influence on the yields obtained. For instance, melting together the dicarboxylic acid anhydride with the sulfonamide without any solvent present yields almost exclusively an anil (II).

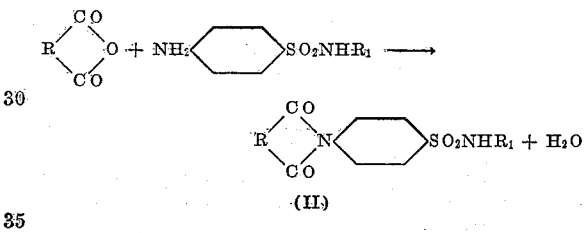

(II)

or a diamide (III).

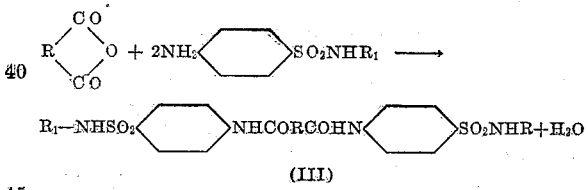

(III)

with many of the dicarboxylic acid anhydrides. If pyridine is being used as a solvent, again mostly the anil will be formed and the desired dicarboxylated sulfonamide can be produced only by subjecting this anil to a further hydrolysis. Absolute alcohol has found wide use for this process and yielded a high proportion of the desired compounds. However, even with the use of alcohol a certain amount of anil has been formed. Actone has also been recommended as a medium for this reaction based on the idea that its low boiling point will not allow the formation of anils since this by-product seems to form only at high temperatures.

APPLICANT'S DEVELOPMENT

According to the present invention, it has been found that $N^4$-dicarboxylic sulfonamide derivatives can be prepared by reacting sulfonamide alkali salts in aqueous solution with the corresponding dicarboxylic acid anhydride.

The reactivity of the acid anhydride in an alkaline aqueous medium has been found to be unexpected in view of the fact that acid anhydrides are known to be decomposed in the presence of water. The alkaline salts of sulfonamide yield a solution having a pH between 10 and 11 and it would be normally expected that the acid anhydrides would split at this pH without any other reaction taking place.

It seems, however, that when the splitting actually occurs the "statu nascendi" dicarboxylic acid reacts with the $N^4$-group and the desired dicarboxylated sulfonamide results.

The preferred sulfonamide alkali salts are the sodium or potassium salts of sulfathiazole or sulfanilamide. The preferred acid anhydrides that are used in accordance with the present invention are aliphatic dicarboxylic acid anhydrides, for example, succinic, glutaric, adipic, malonic, maleic, suberic, and sebacic acids and the like or aromatic dicarboxylic acid anhydrides, for example, phthalic and naphthalic acid anhydrides and the like.

In conducting the reaction according to the process of the present invention, the proportions of dicarboxylic acid anhydride and sulfonamide salt may be those required stoichiometrically for the reaction (equimolecular proportions), although it is preferred to use a slight excess of the dicarboxylic acid anhydride, which can be readily removed from the product to drive the reaction to completion.

The amount of water used to dissolve the sulfonamide alkali salt is not critical and depends on the equipment which is used to mix the reactants. With an efficient mixing equipment the amount of water may be reduced, though an increase in the amount of water would make no difference.

EXAMPLES

Illustrative examples of preferred methods of producing the process of the present invention, are as follows:

EXAMPLE 1

Phthalylsulfathiazole 55.5 gm. of sodium sulfathiazole are dissolved in 250 cc. of water under strong stirring. 32.5 gm. of phthalic anhydride are added. Stirring is continued for another three hours. The mixture is made acid to Congo and filtered. The precipitated phthalylsulfathiazole may be purified by conventional methods.

Substituting the 55.5 gm. of sodium sulfathiazole by 58.8 gm. of potassium sulfathiazole, the same product is obtained.

EXAMPLE 2

Succinylsulfathiazole 55.5 gm. of sodium sulfathiazole are dissolved in 250 cc. of water under strong stirring. 22 gm. of succinic anhydride are added. Stirring is continued for another three hours. The mixture is made acid to Congo and filtered. The precipitated succinylsulfathiazole may be purified by conventional methods.

Substituting the 55.5 gm. of sodium sulfathiazole by 58.8 gm. of potassium sulfathiazole, the same product is obtained.

EXAMPLE 3

Phthalylsulfanilamide 39.0 gm. sodium sulfanilamide are dissolved in 200 cc. of water under strong stirring. 32.5 gm. of phthalic anhydride added. Stirring is continued for another three hours. The mixture is made acid to Congo and filtered. The precipitated phthalylsulfanilamide may be purified by conventional methods.

Substituting the 39.0 gm. sodium sulfanilamide by 42.0 gm. potassium sulfanilamide, the same product is obtained.

EXAMPLE 4

Succinylsulfanilamide 39.0 gm. sodium sulfanilamide are dissolved in 200 cc. of water under strong stirring. 22 gm. of succinic anhydride added. Stirring is continued for another three hours. The mixture is made acid to Congo and filtered. The precipitated succinylsulfanilamide may be purified by conventional methods.

Substituting the 39.0 gm. sodium sulfanilamide by 42.0 gm. potassium sulfanilamide, the same product is obtained.

ADVANTAGES

The advantages of the present invention are that the reaction can be carried out in the presence of water without the formation of anil or diamide. The present invention has been found to give high yield of the desired product and also to give a product having high purity. Furthermore, the present invention can be carried out in the absence of heat and the absence of solvents.

We claim:

1. A process for the manufacture of an $N^4$-dicarboxyacylsulfanilamide wherein the carboxyacyl radical is derived from a dicarboxylic acid, comprising, reacting the alkali metal salt of a sulfanilamide in aqueous solution with the corresponding dicarboxylic acid anhydride without the addition of heat.

2. A process for the manufacture of an $N^4$-carboxyacylsulfanilamide wherein the carboxyacyl radical is derived from a dicarboxylic acid, comprising, reacting the alkali metal salt of a sulfanilamide selected from the group consisting of sulfathiazole and sulfanilamide in aqueous solution without the corresponding dicarboxylic acid anhydride without the addition of heat.

3. A process for the manufacture of $N^4$-(o-carboxybenzoyl)-sulfathiazole, comprising, reacting sodium sulfathiazole in aqueous solution with phthalic anhydride without the addition of heat.

4. A process for the manufacture of $N^4$-(beta-carboxypropionyl)-sulfathiazole, comprising, reacting sodium sulfathiazole in aqueous solution with succinic anhydride without the addition of heat.

5. A process for the manufacture of $N^4$-(o-carboxybenzoyl)-sulfanilamide, comprising, reacting sodium sulfanilamide in aqueous solution with phthalic anhydride without the addition of heat.

6. A process for the manufacture of N⁴-(beta-carboxypropionyl)-sulfanilamide, comprising, reacting sodium sulfanilamide in aqueous solution with succinic anhydride without the addition of heat.

GEZA SZABADOS DELMAR.
ERNEST NEIL MACALLUM.

REFERENCES CITED

The following references are of record in the file of this patent:

UNITED STATES PATENTS

| Number | Name | Date |
|---|---|---|
| 2,274,716 | Lyford | Mar. 3, 1942 |
| 2,324,013 | Moore | July 13, 1943 |
| 2,391,853 | Zienty | Dec. 25, 1945 |
| 2,404,737 | Moore | July 23, 1946 |

FOREIGN PATENTS

| Number | Country | Date |
|---|---|---|
| 538,884 | Great Britain | Aug. 20, 1941 |
| 569,051 | Great Britain | May 2, 1945 |
| 843,415 | France | July 3, 1939 |

OTHER REFERENCES

Miller et al., Jour. Amer. Chem. Soc., vol. 61 (1939) pp. 1198–1200.